July 1, 1924.
F. PETERSEN
PLOWPOINT
Filed Jan. 18, 1923
1,499,402
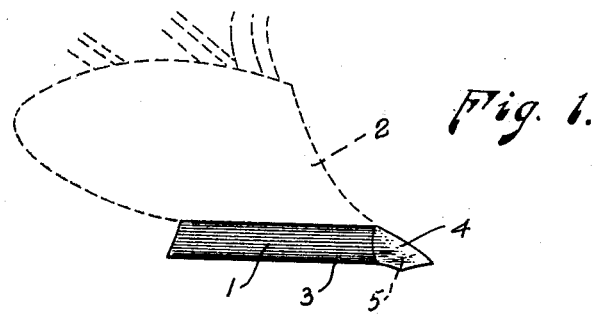
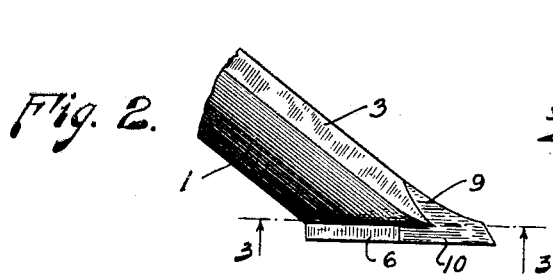
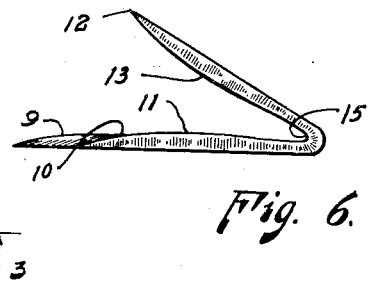
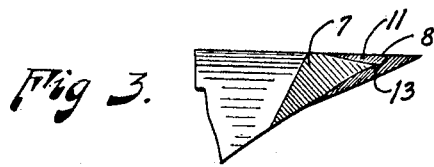
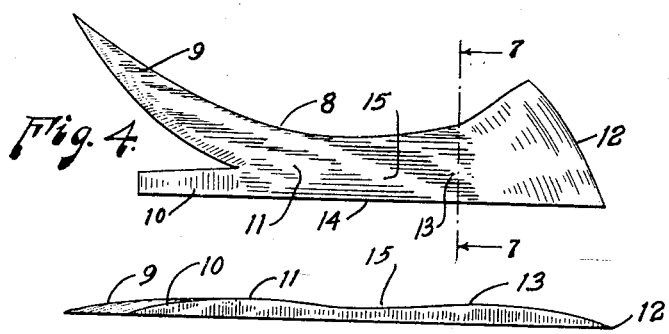
Inventor
Fred Petersen.
By A. J. O'Brien
Attorney Patented July 1, 1924.

1,499,402

UNITED STATES PATENT OFFICE.

FRED PETERSEN, OF LONGMONT, COLORADO.

PLOWPOINT.

Application filed January 18, 1923. Serial No. 613,376.

*To all whom it may concern:*

Be it known that I, FRED PETERSEN, a citizen of the United States, residing at route 4, Longmont, county of Weld, and State of Colorado, have invented certain new and useful Improvements in Plowpoints; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in plow points and has reference in particular to an improved construction of a piece of steel adapted to be used in the repair of worn plow points.

The ordinary plow employed by farmers and others in plowing, is subject to wear like all other tools and machines, and in order to make it possible to sharpen and repair the plow-share, it is made so that it can be readily removed from the plow for greater convenience in handling while it is subjected to the operations of the blacksmith.

The part that wears the fastest is the point of the plowshare, and this must therefore be subjected at intervals to sharpening and to the operation of having a layer of steel welded thereto for the purpose of replacing the portion worn away.

In the operation of welding a piece to the point, it is first necessary to forge the piece of steel into the proper shape. One end of the piece of steel must be split and one of the split portions curved to conform to the curvature of the throat of the plowshare and the other portion straight to fit the landside. The other end must then be properly curved and drawn out to fit the upper surface of the plowshare. The preparation of the piece which is to be used in repairing the point oftentimes consumes more time and labor than the welding of the same in place after it has been prepared.

It is the object of this invention to devise a plow point which can be formed into the proper shape by drop forging, and which is so shaped and proportioned that it will be absolutely ready to be applied to a worn out plowshare point without any preliminary work on the part of the blacksmith. The point is so proportioned that the stock is just where it is needed and worked down to a thin edge, enabling the blacksmith, with a minimum amount of labor, to do a very smooth job. The stock for the landside and throat is shaped just right and so proportioned that regardless of where the plowshare is most worn, either on the top, the bottom or the landside, the shape of the point from heavy stock to feather-edge will enable any blacksmith to fill out the worn parts and work the new point down to a smooth, gradual taper, avoiding any hollow or low places which can only be conveniently accomplished by a properly designed point.

In order to better and more clearly describe my invention, I shall have reference to the accompanying drawing, in which:

Fig. 1 is a side elevation of a plowshare showing my improved point welded in place thereon.

Fig. 2 is a bottom plan view of the plow share showing how the point is welded to the bottom of the landside and the throat.

Fig. 3 is a section taken on line 3—3, Fig. 2.

Fig. 4 is a plan view of my improved plow point.

Fig. 5 is a side elevation of the member shown in Fig. 4.

Fig. 6 is a side elevation similar to Fig. 5, but showing the point bent ready to be welded in place; and Fig. 7 is a transverse section taken on line 7—7, Fig. 4.

The same reference numbers will be used to designate the same parts throughout the several views.

Numeral 1 represents a plowshare and 2 shows by dotted lines the moldboard which cooperates with the share. The plowshare has a cutting edge 3 and a point 4 which, in Figs. 1, 2 and 3, is shown as having been repaired by having a piece of steel welded thereto to replace what has been worn away. The dotted line 5 in Fig. 1 shows the point of the plowshare before the same was repaired.

In Fig. 2 I have shown a bottom plan view of a plowshare, the numeral 6 indicating the landside thereof. This figure also shows the manner in which the plow point has been attached to the plowshare. The point of the plowshare usually wears to a shape somewhat as indicated by the cross-hatched portion 7 in Fig. 3, and is repaired by welding thereto my improved plow point 8 which forms the subject of this invention, and which is formed in the shape shown in Figs. 4, 5 and 7. A flat steel bar 8 has one end split and formed into two portions, 9 and 10, the former being outwardly curved so as to fit the throat of the plowshare while the latter is left straight and is adapted to be welded to the bottom of the landside 6. Ends 9 and 10 increase in thickness toward the center portion of the bar and reach their maximum thickness at point 11. The other end of bar 8 is thinned into a sharp curved edge 12 which increases in thickness towards the center of the bar and attains its maximum thickness at a point indicated by numeral 13. The side of the bar, indicated by numeral 14, is straight and fits along the landside of the plow, while the opposite side is curved in the manner shown in Fig. 4.

Particular attention is called to the manner in which my plow point is formed with two thickened portions 11 and 13 with an intermediate thinner portion 15. The plow point is bent at its thin portion 15 in the manner indicated in Fig. 6. The disposition of the metal in the manner shown and described is very important as it provides the required stock for filling out the worn places without producing hollows and without an undue amount of work. In Fig. 3 I have shown a section which illustrates clearly how the thickened portions 11 and 13 cooperate to fill out the worn places and to still leave the point smooth and free from depressions.

It is of great importance in repointing plows to be able to leave the surface smooth, because then the plowshare will scour from the very first and the plow will require a considerably less amount of power to operate it than if the share was rough and did not scour.

Having now described my invention, what I claim as new is:

1. A plow point comprising a bar of rectangular cross-section, having one end split into two parts, one of which is curved away from the other, the other end of the bar being curved outwardly to one side, said bar having its ends thinned to an edge; a thickened portion near each end; and an intermediate thinner portion.

2. A plow point adapted for use in repairing worn plowshares, consisting of a barlike piece of steel having a rectangular cross-section, one end of said bar being split for a short distance and one of the parts outwardly curved so as to fit the throat of the plowshare, the other part being straight and adapted to fit against the bottom of the landside, the other end being thinned to a point and sharpened; a thickened portion near each end; and an intermediate thin portion.

In testimony whereof I affix my signature.

FRED PETERSEN.